(12) United States Patent
Park (10) Patent No.: US 11,555,577 B2
(45) Date of Patent: Jan. 17, 2023

(54) MAGNETIC MOUNTING APPARATUS FOR ELECTRONIC DEVICES

(71) Applicant: Paul Park, Wayne, NJ (US)

(72) Inventor: Paul Park, Wayne, NJ (US)

( * ) Notice: Subject to any disclaimer, the term of this patent is extended or adjusted under 35 U.S.C. 154(b) by 131 days.

(21) Appl. No.: 17/227,742

(22) Filed: Apr. 12, 2021

(65) Prior Publication Data

US 2022/0325850 A1 Oct. 13, 2022

(51) Int. Cl.
| | | |
|---|---|---|
| F16M 13/00 | (2006.01) | |
| F16M 13/02 | (2006.01) | |
| F16C 11/04 | (2006.01) | |
| F16B 2/18 | (2006.01) | |
| F16B 2/06 | (2006.01) | |
| A63B 71/06 | (2006.01) | |
| A63B 102/32 | (2015.01) | |

(52) U.S. Cl.
CPC ....... *F16M 13/022* (2013.01); *A63B 71/0622* (2013.01); *F16B 2/06* (2013.01); *F16B 2/18* (2013.01); *F16C 11/04* (2013.01); *A63B 2071/0647* (2013.01); *A63B 2102/32* (2015.10); *A63B 2209/08* (2013.01); *A63B 2220/806* (2013.01); *A63B 2220/807* (2013.01)

(58) Field of Classification Search
CPC ..... F16M 13/022; A63B 71/0622; F16B 2/06; F16B 2/18; F16B 1/00; F16C 11/04
See application file for complete search history.

(56) References Cited

U.S. PATENT DOCUMENTS

| | | | | |
|---|---|---|---|---|
| 4,708,512 A | * | 11/1987 | Allert | D01H 7/04 24/285 |
| 2007/0247858 A1 | * | 10/2007 | Ford | F21V 21/088 362/382 |
| 2019/0120407 A1 | * | 4/2019 | Huovila | A61G 5/00 |
| 2020/0145522 A1 | * | 5/2020 | Liu | F16M 11/14 |
| 2021/0161632 A1 | * | 6/2021 | Ganeswaran | G06F 1/1632 |
| 2022/0203905 A1 | * | 6/2022 | Kazempour | F16B 1/00 |

* cited by examiner

Primary Examiner — Amy J. Sterling (57) ABSTRACT

The invention is a magnetic mounting apparatus for electronic devices used to film sports motion, personal content, and hands-free video and music streaming. The mounting apparatus includes a silicone coated threaded magnet, a clamp lined with a rubber mold, and an adjustable toggle latch locking clasp that allows attachment to rods or shafts of varying widths. The threaded magnet is of sufficient magnetic force to securely support the electronic device. Such electronic devices include and are not limited to smart phones, tablets, and cameras. A metal ferrous plate is attached to the electronic device with adhesive, thereby providing a secure magnetic connection between the mounting apparatus and electronic device.

10 Claims, 11 Drawing Sheets

MAGNETIC MOUNTING APPARATUS FOR ELECTRONIC DEVICES

FIELD OF THE INVENTION

The present invention relates to a mounting apparatus for electronic devices. The mounting apparatus magnetically secures the electronic device for a user to photograph, record a video, or live stream the user participating in a sporting activity. Such electronic devices include and are not limited to smart phones, tablets, and cameras. The magnetic mounting apparatus is attached to a support rod by a clamp and is positioned on a support surface.

BACKGROUND OF THE INVENTION

Sports athletes practice to improve performance persistently. Particularly, golf is recognized as one of the most difficult and competitive sports. While there are many well-known methods and practices, the integration of technology and biomechanical data has become more prevalent in the sports industry to assist athletes in improving performance. Some methods include training with professionals and training alone with self-teaching tutorials. Working with professional trainers or instructors can be costly and practicing alone lacks the in-depth analysis to critical improvement observations. There is an inherent need to record, monitor, and analyze a player's performance, such as a golf swing, for improved results.

This invention is specifically for documenting golf swings. During training and practice, digital documentation is essential to reviewing and analyzing for progressive improvement. Electronic devices are often positioned at specific angles and orientations to optimize the field view.

There are many self-standing tripods and mounting apparatuses for documenting on an electronic device known in the market. However, tripods and mounting apparatuses can be large, heavy, unstable in the wind, and cumbersome to travel around with. In other cases, the mounting apparatuses are flimsy and difficult to attach and detach the electronic device onto the mounting apparatus. The electronic device is often secured to the mounting apparatus with a clamp mechanism or a threaded fastener.

The magnetic mounting system is directed to resolve and improve the problems of existing mounting apparatuses. Not only does this solve the issues related to photographing and filming, it provides hands-free viewing access to the electronic device. As streaming has become readily available, golfers and other athletes are able view their electronic device at a preferred angle whether they are streaming their favorite sports games or viewing data outputted by a golf simulator. The invention has a cradle free design that permits safe and easy one-handed device use.

SUMMARY OF THE INVENTION

The present invention improves and resolves the aforementioned challenges by providing an athlete a compact apparatus to easily photograph or record his own motion, without the assistance of others. The present invention provides a magnetic assembly for holding an electronic device such as a camera, smartphone, tablet computer, GoPro, or the like. The mounting method may be coupled to a rod.

An object of the present invention is to provide a magnetic mounting system for an electronic device for the purpose of filming sports motion, filming personal content, and hands-free video and music streaming comprising: a cylindrical rod; a ferrous metal plate with an adhesive, such as 3M adhesive; and a magnetic mounting assembly, having a silicone coated magnet coupled to a clamp, wherein the clamp comprises an adjustable toggle latch locking clasp, a protruding screw to connect the silicone coated magnet, and a U-shaped rubber mold, wherein the rubber mold is constructed to provide a stable attachment to a cylindrical rod.

The advantages of the present invention are: the magnetic mounting assembly can be conveniently attached to a cylindrical rod by means of a clamp; the magnetic mounting assembly coupled to a cylindrical rod is inserted into the ground or a horizontal surface, thereby provide a stable support surface so documenting is uninterrupted by the wind; any electronic recording device is easily mounted and dismounted to the magnetic mount with the metal plate having adhesive; the magnetic attachment provides a secure and adjustable connection means between the electronic recording device and mounting system; the magnetic mounting assembly coupled to the cylindrical rod allows users to film sports motion, personal content, and view content on the electronic device without anyone's assistance; the magnetic mounting assembly is constructed so that the user can mount and unmount his electronic device with one hand and adjust the angular orientation of the electronic device; the clamp is constructed with a U-shaped rubber mold with an adjustable locking clasp that functions as a gripping mechanism to prevent slipping of the mounting assembly along the rod; the mounting apparatus is easy-to-use, lightweight, portable, and convenient.

Although the present invention is briefly summarized, the fuller understanding of the invention can be obtained by the following drawings, detailed description, and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
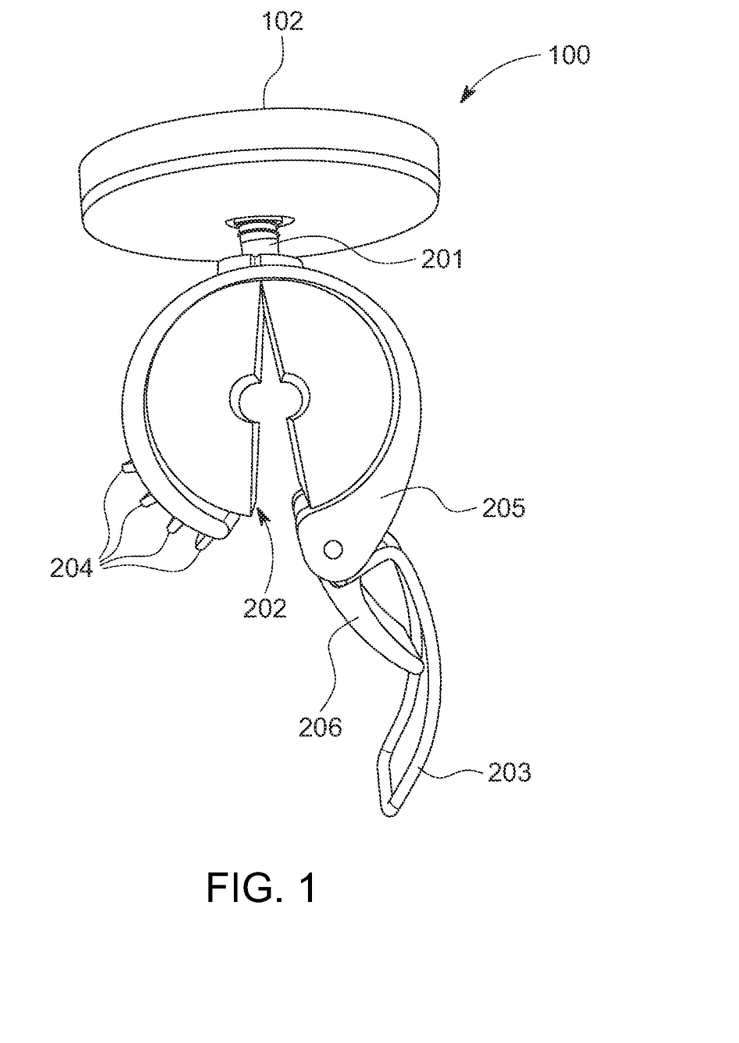
FIG. 1 is an overhead view of the mounting assembly of the electronic device mounting apparatus in an open position according to one embodiment of the present invention.
Figure 2:
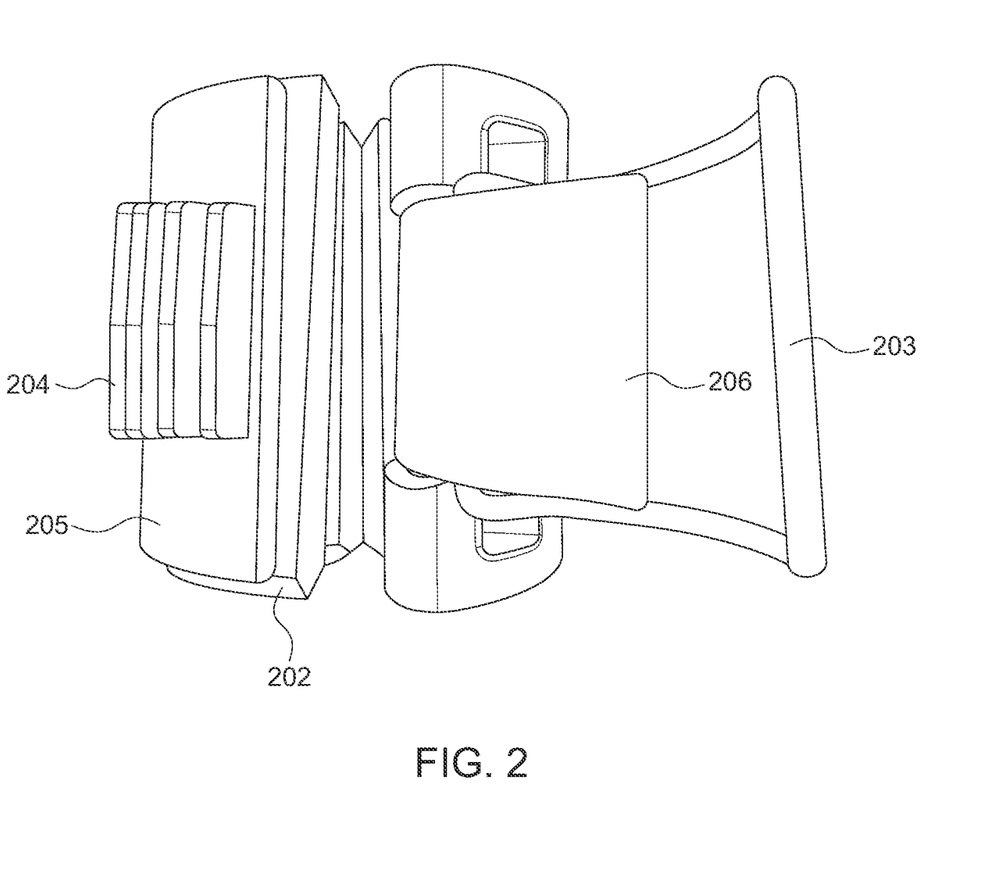
FIG. 2 is a rear perspective view of the mounting assembly of the electronic device mounting apparatus in an open position, according to one embodiment of the present invention.
Figure 3:
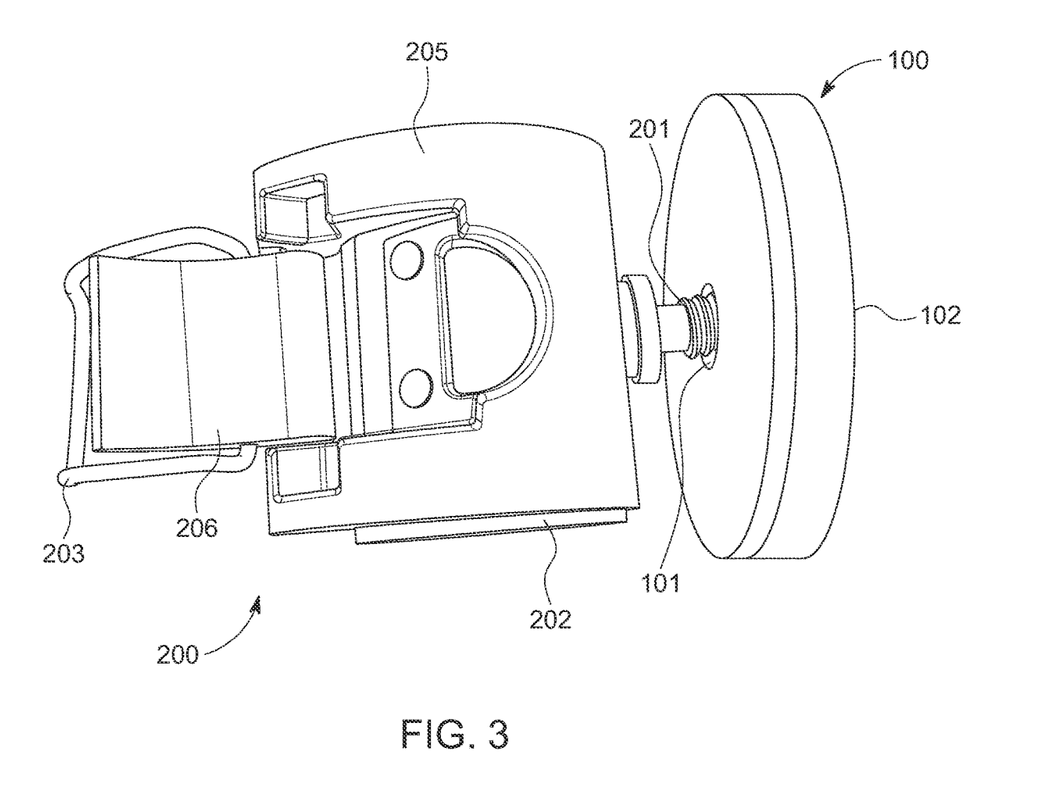
FIG. 3 is a right perspective view of the mounting assembly of the electronic device mounting apparatus in an open position according to one embodiment of the present invention.
Figure 4:
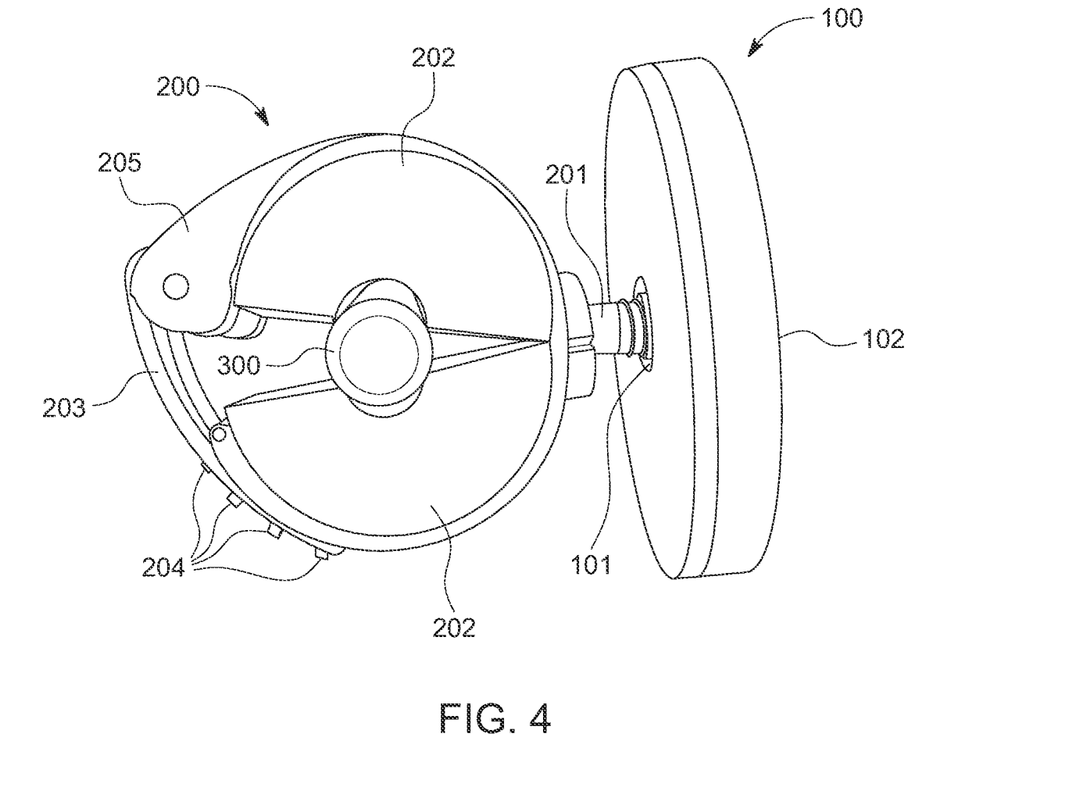
FIG. 4 is an overhead view of the mounting assembly of the electronic device mounting apparatus, the mounting assembly receiving a cylindrical rod in a closed position, according to one embodiment of the present invention.
Figure 5:
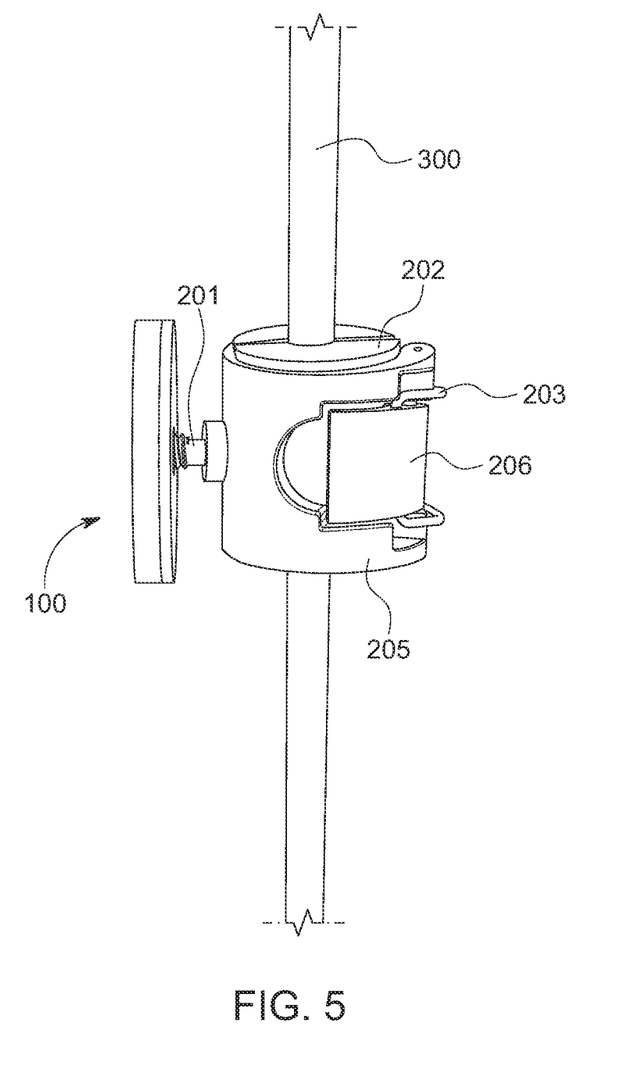
FIG. 5 is a right perspective view of the mounting assembly of the electronic device mounting apparatus, the mounting assembly receiving a rod holder in a closed position, according to one embodiment of the present invention.

FIG. 1 shows an overhead perspective view of the magnetic mounting apparatus 200 in an open position according to one embodiment of the present invention, and FIG. 2 shows a rear perspective view of a magnetic mounting apparatus 200 in an open position according to one embodiment of the present invention. FIG. 3 shows a right perspective view of the magnetic mounting apparatus 200 in an open position according to one embodiment of the present invention. FIG. 4 shows an overhead perspective view of a magnetic mounting apparatus 200 coupled to a cylindrical rod 300 in a closed position according to one embodiment of the present invention. In addition, FIG. 5 shows a right perspective view of a magnetic mounting apparatus 200 coupled to a cylindrical rod 300 in a closed position according to one embodiment of the present invention. The magnetic mounting apparatus 200 may be coupled to a cylindrical rod 300 made of steel, aluminum, any other metal, wood, fiber glass, or the like. The rod 300 may include a pointed end, which may be used to spike the rod 300 into the ground.

As shown in FIGS. 1-5 a magnetic mounting apparatus 200 constructed to hold an electronic device for the purpose of photographing and documenting sports motion may include: a magnetic head 100. The mounting apparatus 200 is adapted to fixedly attached unto an elongated rod 300. The mounting apparatus 200 is provided with a hard exterior shell, a clamp 205, made of a thermoplastic material that is resilient and flexible. The clamp 205 has a single opening into an interior region of the clamp shell that is further characterized with a rubber insert 202. The rubber insert 202 occupies the majority of the cavity of the clamp 205. The rubber insert is provided as a gripping mechanism for the clamp to securely fasten unto the elongated rod 300. The clamp further includes a cylindrical void along the central axis of the rubber insert for the elongated rod 300 to be inserted. The clamp comprises a threaded protrusion 201 that is adapted to secure a means of attachment, in this embodiment the means of attachment is a magnetic head 100. The clamp 200 further comprises a toggle latch arm 203, a toggle latch locking clasp 206, and a plurality of plastic protrusions 204 to allow locking adjustability.

The rubber insert 202 is made of a first and second insert, wherein each the first and second inserts of the rubber insert 202 is shaped to be fitted inside the cavity of the clamp interior. The rubber insert further comprises a void to securely accept the insertion of the elongated rod 300 oriented along the central axis of the clamp 205. The clamp, having an opening on one side provides a pathway for the elongated rod 300 to enter into the void of the rubber insert 202. Upon insertion of the rod 300, the clamp in cooperation with the rubber insert is securely fastened by means of a locking mechanism. The opening void within the rubber insert is of a smaller radius than the radius of the elongated rod 300. While the dimensions of the elongated rod 300 may vary, the size of the rod is dimensioned to fit within the rubber insert without slippage.

The locking mechanism allows the elongated rod 300 access to the interior of the clamp 205 and to securely lock the position of the magnetic mounting apparatus 200 along the elongated rod 300. The locking mechanism comprises the toggle latch locking clasp 206, the toggle latch arm 203, and the plurality of plastic protrusions 204. In an opened configuration, shown in FIG. 1, the toggle latch arm 203 is pivotably coupled to clamp 205. The toggle latch arm 203 may pivot over one of the plurality of plastic protrusions 204. The toggle latch locking clasp 206 is pressed toward the interior of the clamp 205 to lock and close the magnetic mounting apparatus 200, thereby securely fastening to the elongated rod 300. In the lock position, the toggle latch arm 203 hooked and engaged with one of the plurality of plastic protrusions 204 hold the clamp in tension to lock the clamp closed as shown in FIG. 4.

Along the opposing side of the clamp 205 from the locking mechanism is the threaded protrusion 201. The threaded protrusion is provided as a means for attaching the magnetic head 100 to the clamp 205. The threaded protrusion is constructed at a ¼" inch threaded size to fit universal camera accessories including other physical clamps. The magnetic head 100 is the connection to facilitate the attachment of the electronic device 500 to the mounting apparatus.

Figure 6:
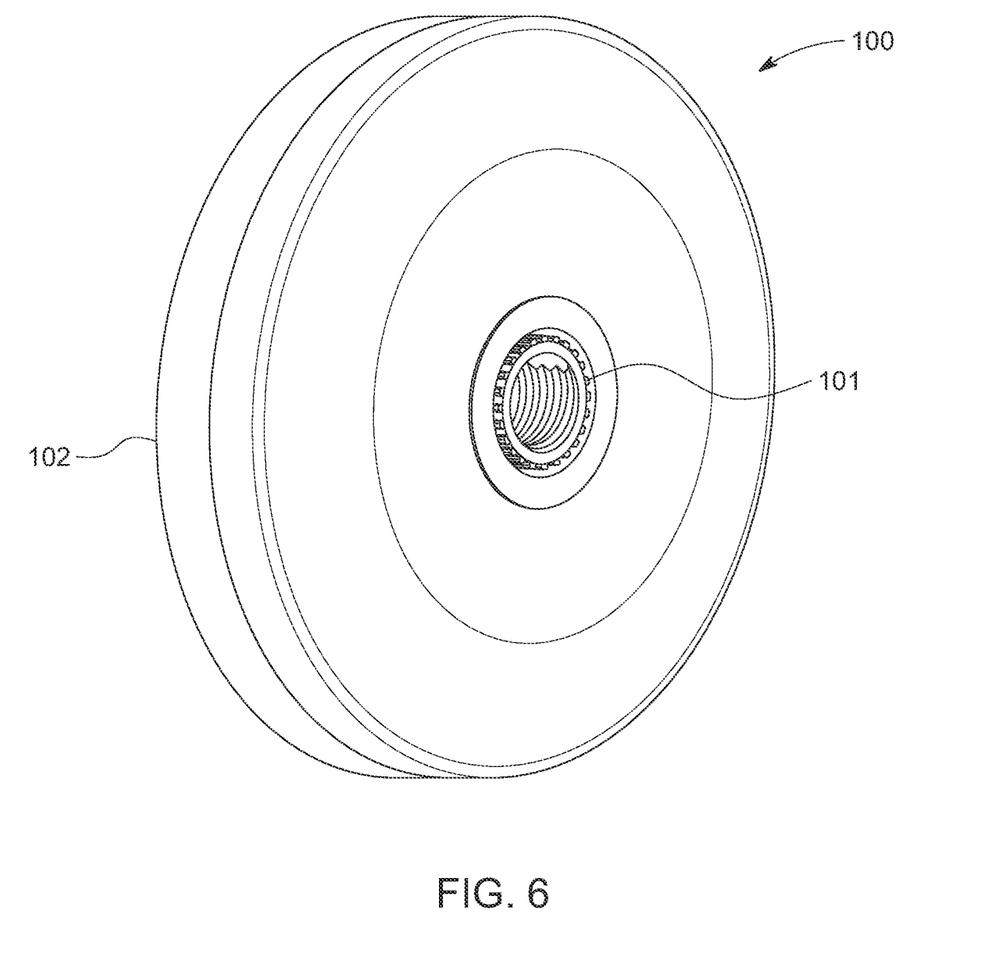
FIG. 6 is a rear perspective view of the magnetic head of the mounting assembly of the electronic device mounting apparatus according to one embodiment of the present invention.
Figure 7:
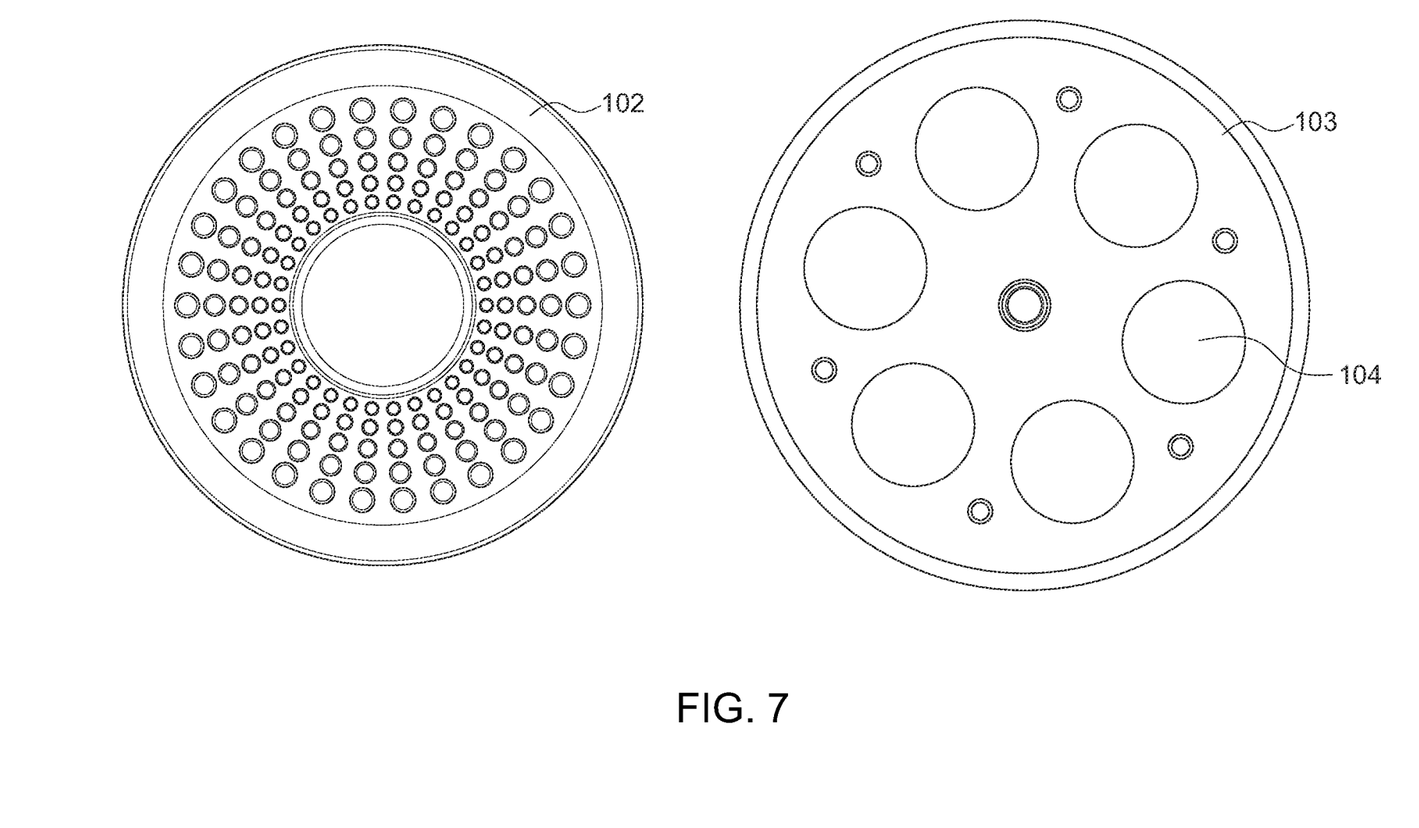
FIG. 7 is a front sectional view of the magnetic head comprising individual magnets according to one embodiment of the present invention.

FIG. 6 illustrates a rear perspective view of the magnetic head 100 of the mounting apparatus 200 and FIG. 7 illustrates a front sectional view of the magnetic head 100. The magnetic head 100 comprises a threaded hole 101 that is attached to the threaded protrusion 201 on the magnetic mounting apparatus. The magnetic head is substantially planar having two sides. The first side of the magnetic head is provided with a silicone cover 102 and a second side opposite the first side is a ferrous metal base plate 103 bearing individual magnets 104. The ferrous metal plate 103 with individual magnets 104 found in FIG. 7 can be provided with one or more magnets to provide the appropriate magnetic flux to securely support the weight load capacity of the mounting system holding the electronic device 500. The magnet head is coated with silicone, rubber, plastic, or the like. The cover provides a soft surface to prevent damage from scratches on the electronic device when coupling and decoupling from the mounting apparatus.

As shown in FIGS. 1-5 and 8-11, a magnetic head 100 attaches directly to the threaded protrusion 201 of the magnetic mounting apparatus 200 according to one embodiment of the present invention. The electronic device such as a smart phone 500 is attached to the magnetic head 100 as shown in FIGS. 8-11.

Figure 8:
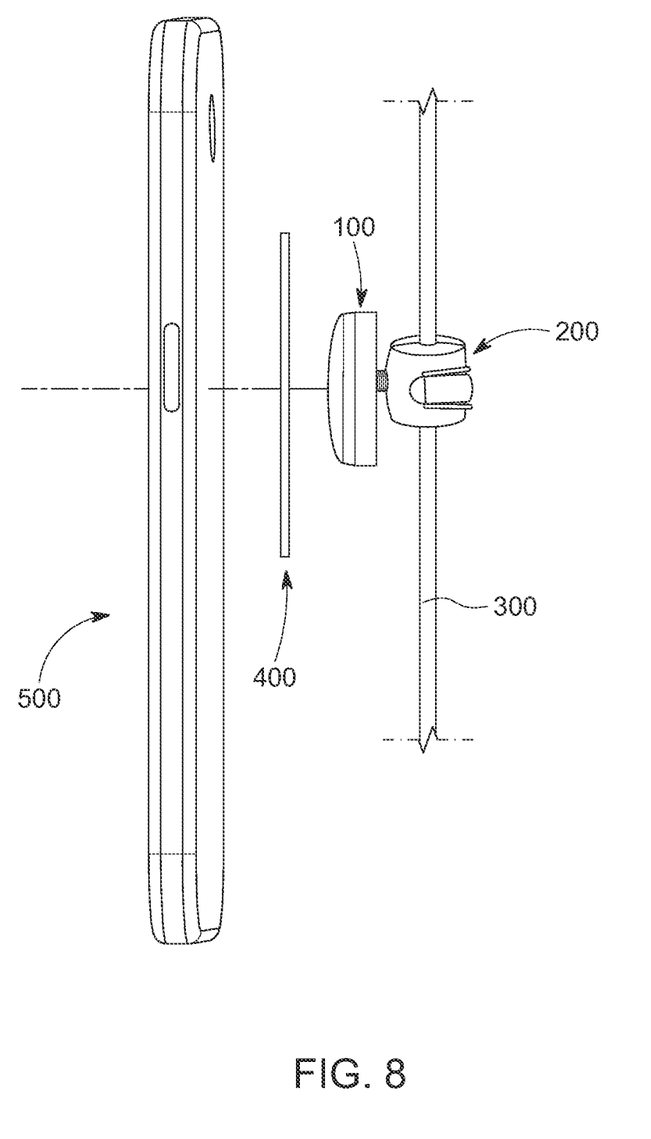
FIG. 8 is a right perspective view of the mounting assembly of the electronic device mounting apparatus, a mounting assembly receiving a cylindrical rod in a closed position, according to one embodiment of the present invention.
Figure 9:
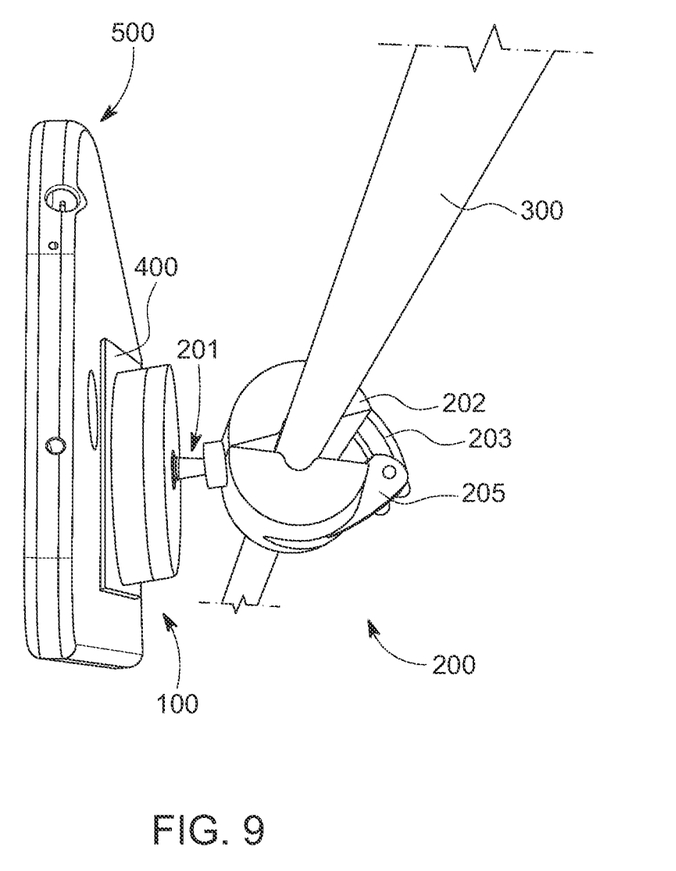
FIG. 9 is an overhead perspective view of the smart phone attached to a mounting assembly of the electronic device mounting apparatus, a mounting assembly receiving a cylindrical rod in a closed position, according to one embodiment of the present invention.
Figure 10:
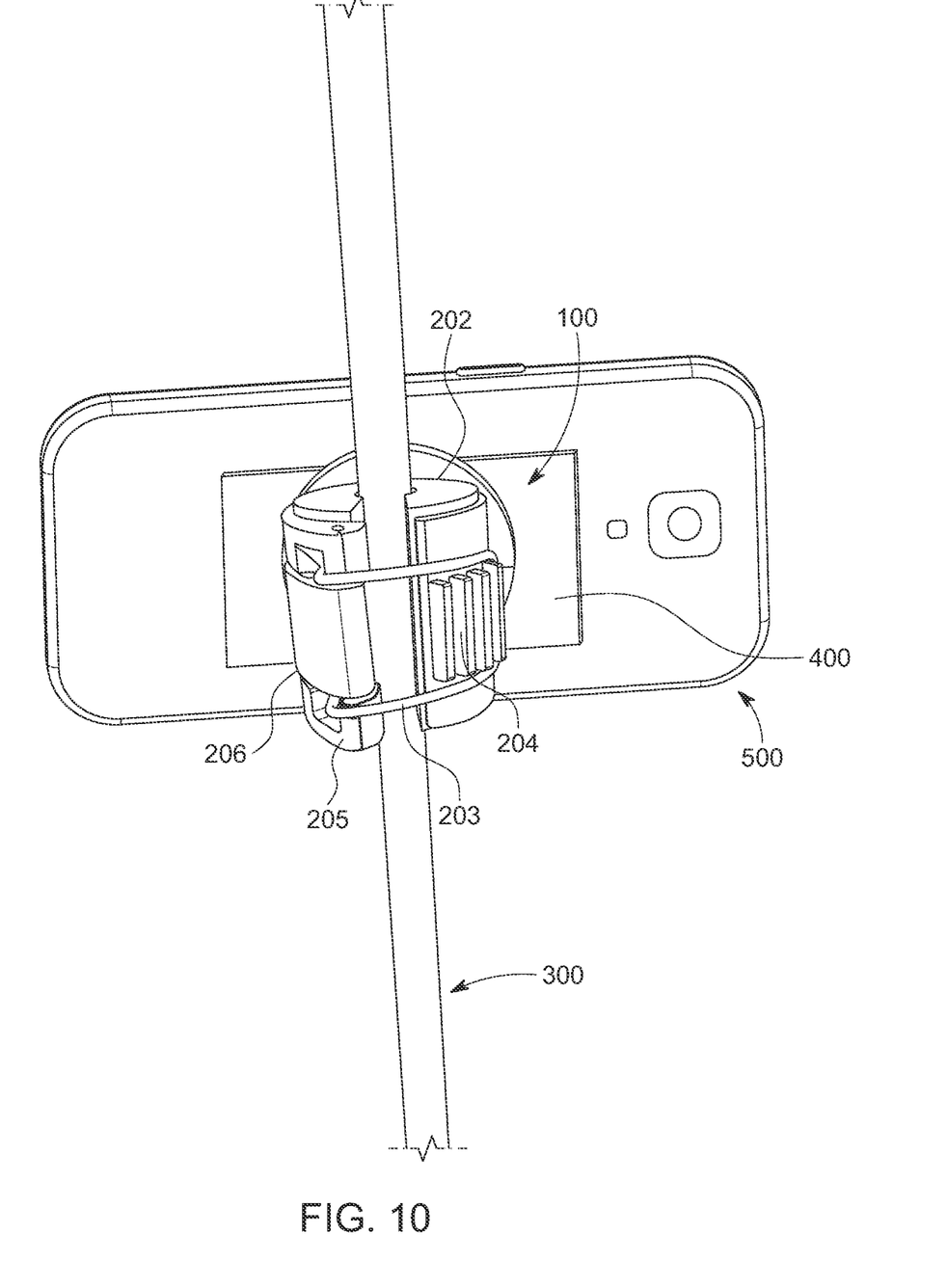
FIG. 10 is a rear perspective view of a smart phone attached to a mounting assembly of the electronic device mounting apparatus, a mounting assembly receiving a cylindrical rod in a closed position, according to one embodiment of the present invention.
Figure 11:
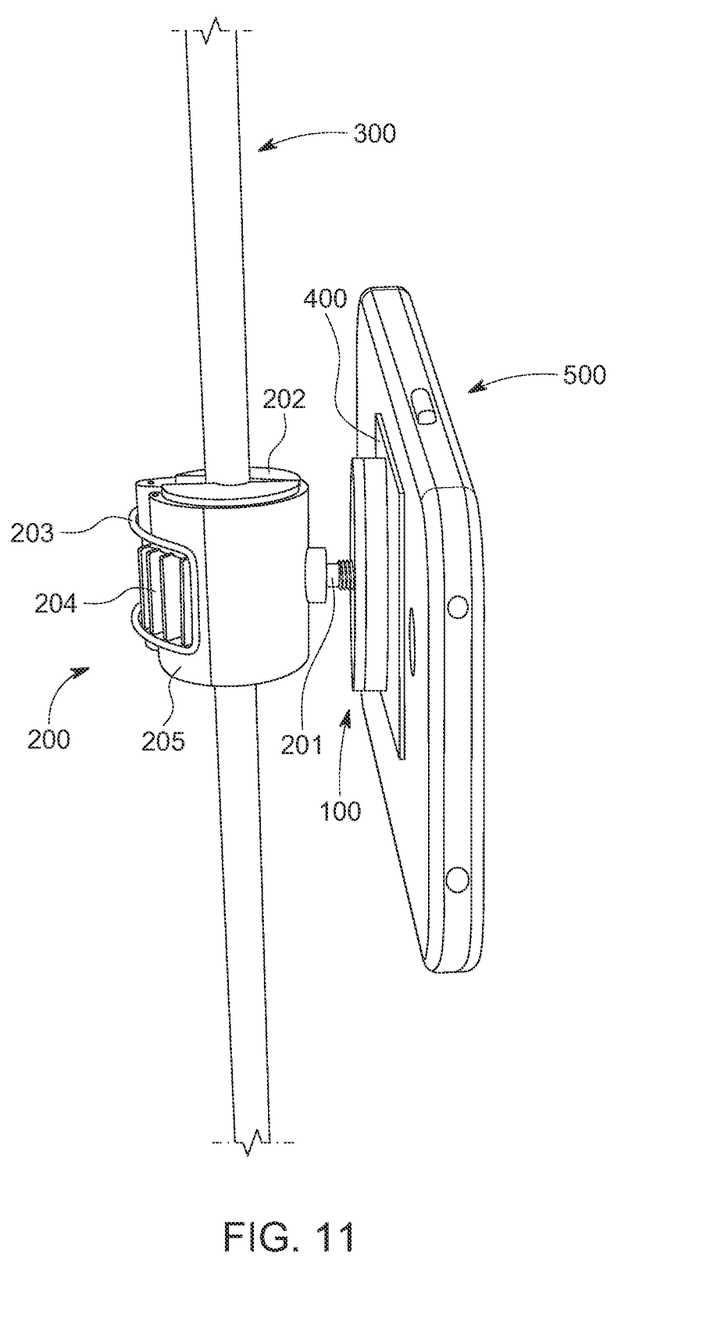
FIG. 11 is a left perspective view of a smart phone attached to a mounting assembly of the electronic device mounting apparatus, a mounting assembly receiving a rod holder in a closed position, according to one embodiment of the present invention.

FIG. 8 shows a side exploded view of a smart phone 500, ferrous metal plate with adhesive, and a magnetic mounting apparatus 200 coupled to a cylindrical rod 300. FIG. 9 illustrates an overhead perspective view of a smart phone 500 mounted onto a magnetic mounting apparatus 200 that is coupled to a cylindrical rod 300 according to one embodiment of the present invention. FIG. 10 shows a rear perspective view of a smart phone 500 connected to a magnetic mounting apparatus 200 that is coupled to a cylindrical rod 300 according to one embodiment of the present invention. In addition, FIG. 11 shows a left perspective view of a smart phone 500 connected to a magnetic mounting apparatus 200 coupled to a cylindrical rod 300 according to one embodiment of the present invention. The electronic device to be mounted may be a phone, tablet computer, camera, GoPro, or the like.

The electronic device 500 is provided with a ferrous metal plate 400. The ferrous metal plate 400 is made of magnetic material that can engage with the magnetic head 100. The ferrous metal plate 400 is substantially planar, wherein the first side of the ferrous metal plate attached directly on to the surface of the electronic device 500 is provided with an adhesive layer to easily adhere ferrous metal plate to the surface. The adhesive layer is made of adhesive material well known in the art. A second side of the ferrous metal plate 400 is directly engaged to the surface of the magnetic head, specifically the silicone covering of 102. Alternatively, the ferrous metal plate 400 with an adhesive material (not show) in FIG. 1 may be affixed to or between an electronic device 500 and its protective case. The electronic device may then attach to the magnetic head 100 of the mounting apparatus 200 that is coupled to elongated rod 300 found in FIGS. 8-11. The magnetic means of attachment between the electronic device 500 and mounting apparatus allows for an angularly adjustable rotation position. The electronic device 500 may rotate freely on the magnetic mounting apparatus to photograph portrait and landscape orientation as shown in FIG. 9 and FIG. 10, respectively.

In an outdoor setting, the rod 300 may be used with the electronic device mounting apparatus 200. However, the mounting apparatus may clamp onto a car head rest pole, golf club, or any other elongated cylindrical rod.

Words relating to photography may be understood as relating to photography or videography.

While the invention has been shown and described with reference to different embodiments thereof, it will be appreciated by those skilled in the art that variations in form, detail, compositions and operation may be made without departing from the spirit and scope of the invention as defined by the accompanying claims.

It is worth noting that while specific figures are used, and particular examples have been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A magnetic mount assembly for mounting an electronic device comprising:
   A magnetic mounting apparatus;
       wherein the magnetic mounting apparatus is a cylindrical clamp having an opening and a hollow interior cavity; wherein a rubber insert is attached to the hollow interior cavity of the clamp;
       wherein the rubber insert has an opening along a central axis of the cylindrical clamp that provides a void for inserting an elongated support rod;
       wherein the magnetic mounting apparatus has an opening to access the interior cavity of the clamp comprising a first and second end along a circumference of the clamp;
           wherein the first end of the clamp has a plurality of plastic protrusions, the second end of the clamp is provided with a locking mechanism including a toggle latch arm and toggle latch locking clasp; wherein a close position the toggle latch arm engages with one of the plurality of plastic protrusions to securely fasten and enclose the elongated support rod to the magnetic mounting apparatus;
       wherein the clamp has a thread protrusion along the circumference of the clamp as a means of attachment for a magnetic head; the magnetic head having a planar first side and a planar second side; wherein the planar first side is of magnetic material, the planar second side is provided with a silicone cover; the magnetic head comprising a threaded through hole to fasten on to the threaded protrusion the clamp;
       wherein a ferrous metal plate having an adhesive layer is adhered to the electronic device; thereby providing a means for the electronic device to securely be attached to the magnetic head.

2. The magnetic mount according to claim 1, wherein the planar second side of the magnetic head with silicone cover is in direct contact with the ferrous metal plate of the electronic device.

3. The magnetic mount according to claim 1, wherein ferrous metal plate is affixed to or between the electronic device and a protective case of the electronic device.

4. The magnetic mount according to claim 1, wherein the rubber insert is configured to clamp the cylindrical rod in tension with a gripping force.

5. The magnetic mount according to claim 1, wherein the toggle latch locking clasp is adjustable to attach to cylindrical rods of varying size facilitated by the plurality of plastic protrusions.

6. The magnetic mount according to claim 1, wherein the magnetic head having the magnetic material on the planar first side has magnetic strength to support up to 1400 grams.

7. The magnetic mount according to claim 1, wherein the rubber insert is made of slip-preventing rubber.

8. The magnetic mount according to claim 1, wherein the magnetic head having the threaded hole is compatible with electronic device mounting accessory having a ¼-inch thread protrusion.

9. The magnetic mount according to claim 1, wherein the electronic device is securely mounted onto the magnetic mount assembly to photograph, record, document sporting activities, such as a golf swing.

10. The magnetic mount according to claim 1, wherein the electronic device is magnetically secured to magnetic mounting apparatus; wherein the electronic device is easily adjusted and rotated from a portrait view to a landscape view.

<p align="center">* * * * *</p>